United States Patent
Yamaguchi et al.

(10) Patent No.: US 7,136,997 B2
(45) Date of Patent: Nov. 14, 2006

(54) RADIO NETWORK SYSTEM USING MULTIPLE AUTHENTICATION SERVERS WITH CONSISTENTLY MAINTAINED INFORMATION

(75) Inventors: Kensaku Yamaguchi, Kanagawa (JP); Hideaki Nakakita, Kanagawa (JP); Mikio Hashimoto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 859 days.

(21) Appl. No.: 10/242,636

(22) Filed: Sep. 13, 2002

(65) Prior Publication Data

US 2003/0061516 A1 Mar. 27, 2003

(30) Foreign Application Priority Data

Sep. 26, 2001 (JP) ............... 2001-294960

(51) Int. Cl.
 *H04L 9/00* (2006.01)
 *H04Q 7/20* (2006.01)
 *G06F 15/16* (2006.01)
(52) U.S. Cl. .................. 713/155; 455/433; 455/435.1; 713/153; 726/6
(58) Field of Classification Search ............... 713/153, 713/155; 726/6; 455/433, 435.1
 See application file for complete search history.

(56) References Cited

U.S. PATENT DOCUMENTS 5,509,118 A 4/1996 Tuulos et al. .......... 395/182.14

6,681,111 B1 * 1/2004 Ahn et al. ............... 455/432.2

FOREIGN PATENT DOCUMENTS

JP 2001-148886 5/2001
WO WO 99/35867 A1 7/1999

OTHER PUBLICATIONS

Pending U.S. Appl. No. 10/253,644, filed Sep. 25, 2002.
Pending U.S. Appl. No. 10/242,636, filed Sep. 13, 2002.

* cited by examiner

*Primary Examiner*—Gilberto Barron, Jr.
*Assistant Examiner*—Virgil Herring
(74) *Attorney, Agent, or Firm*—Oblon, Spivak, McClelland, Maier & Neustadt, P.C.

(57) ABSTRACT

A network of radio devices is managed by carrying out a radio device registration at a registering authentication server when it is possible to communicate with all the authentication servers, distributing registration information to the authentication servers, managing the registration information at each one of the authentication servers, carrying out a radio device deletion at a deleting authentication server, distributing deletion information to the authentication servers, and deleting the radio device from the registration information according to the deletion information at each one of the authentication servers.

14 Claims, 11 Drawing Sheets

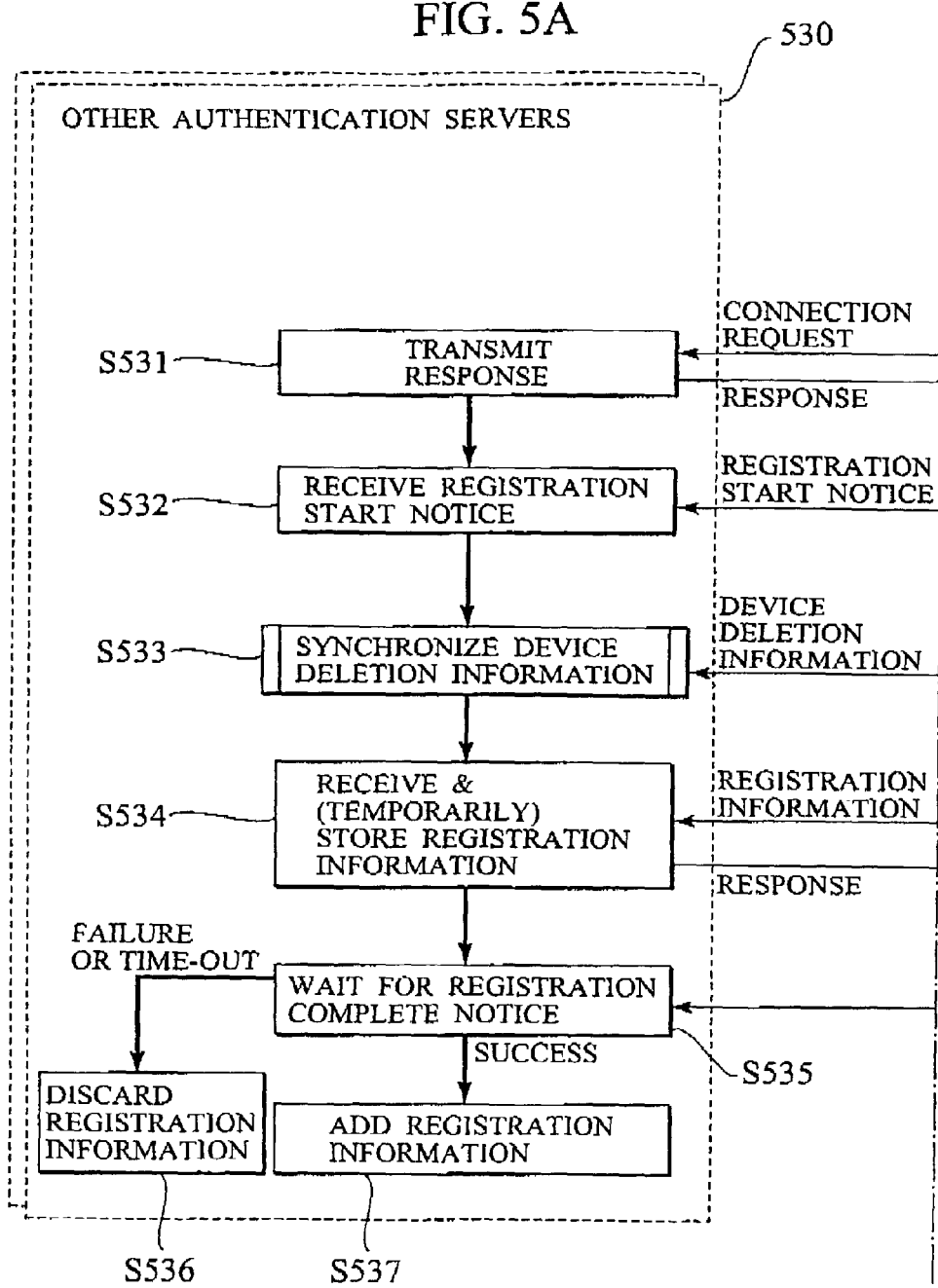

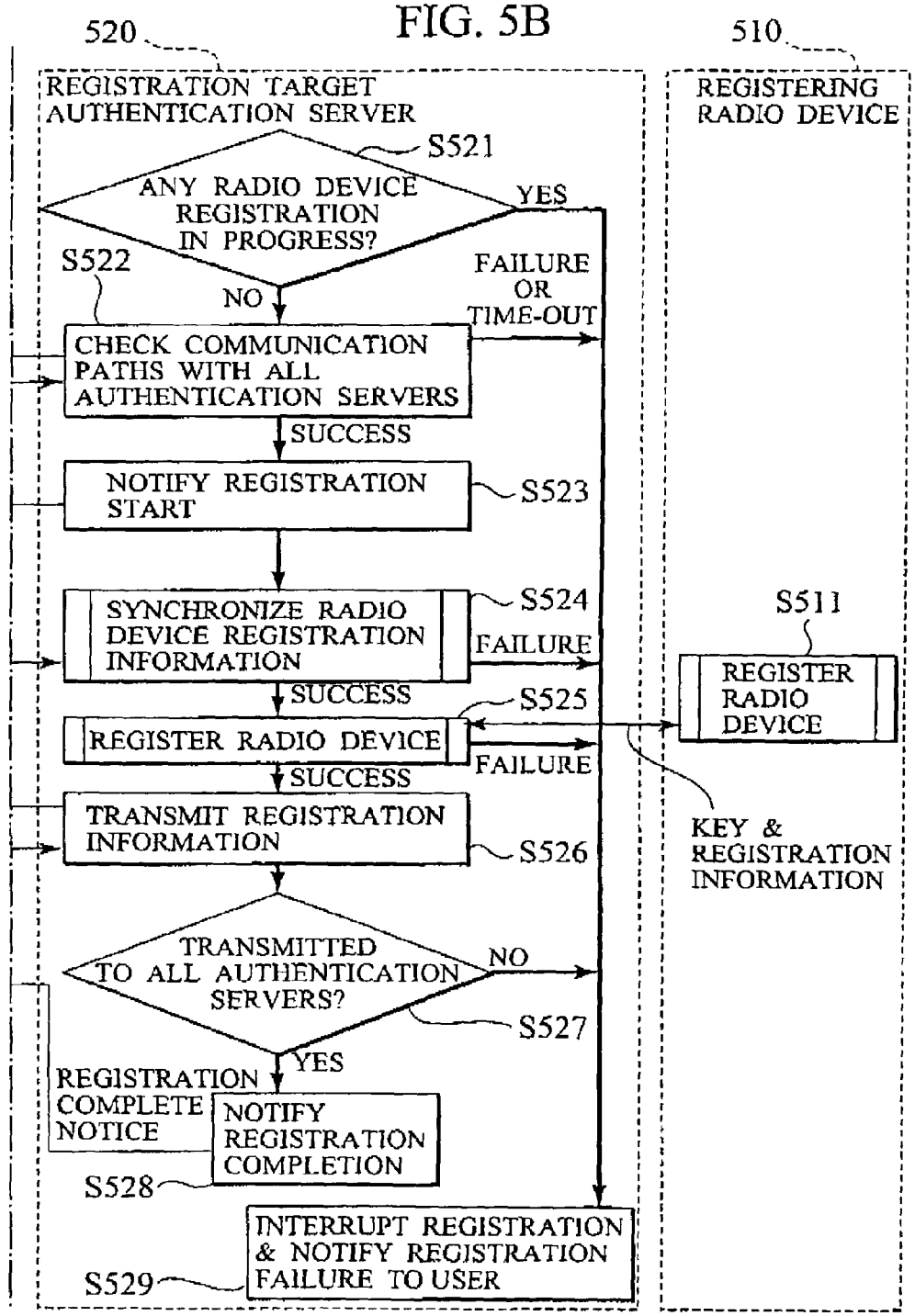

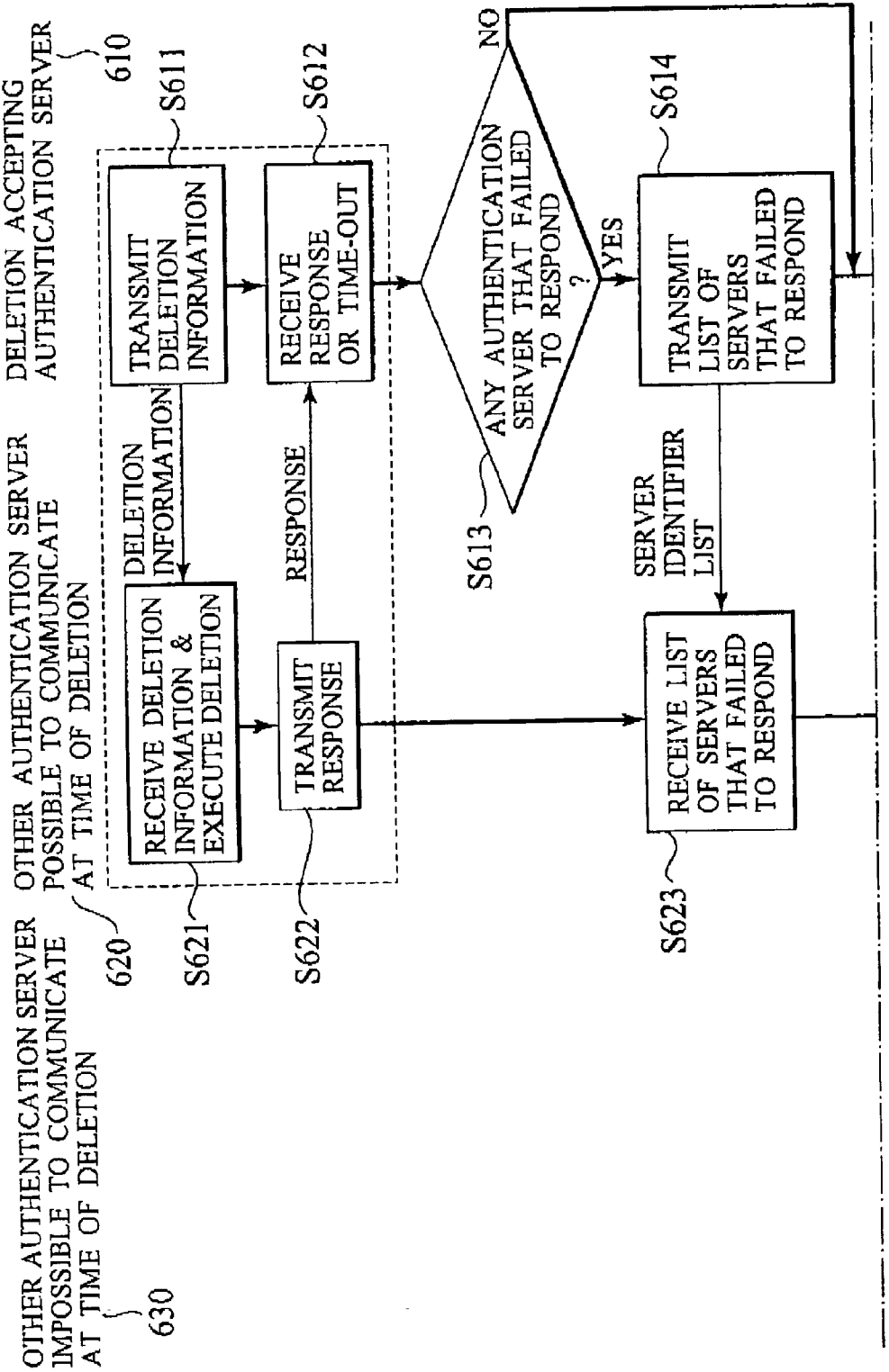

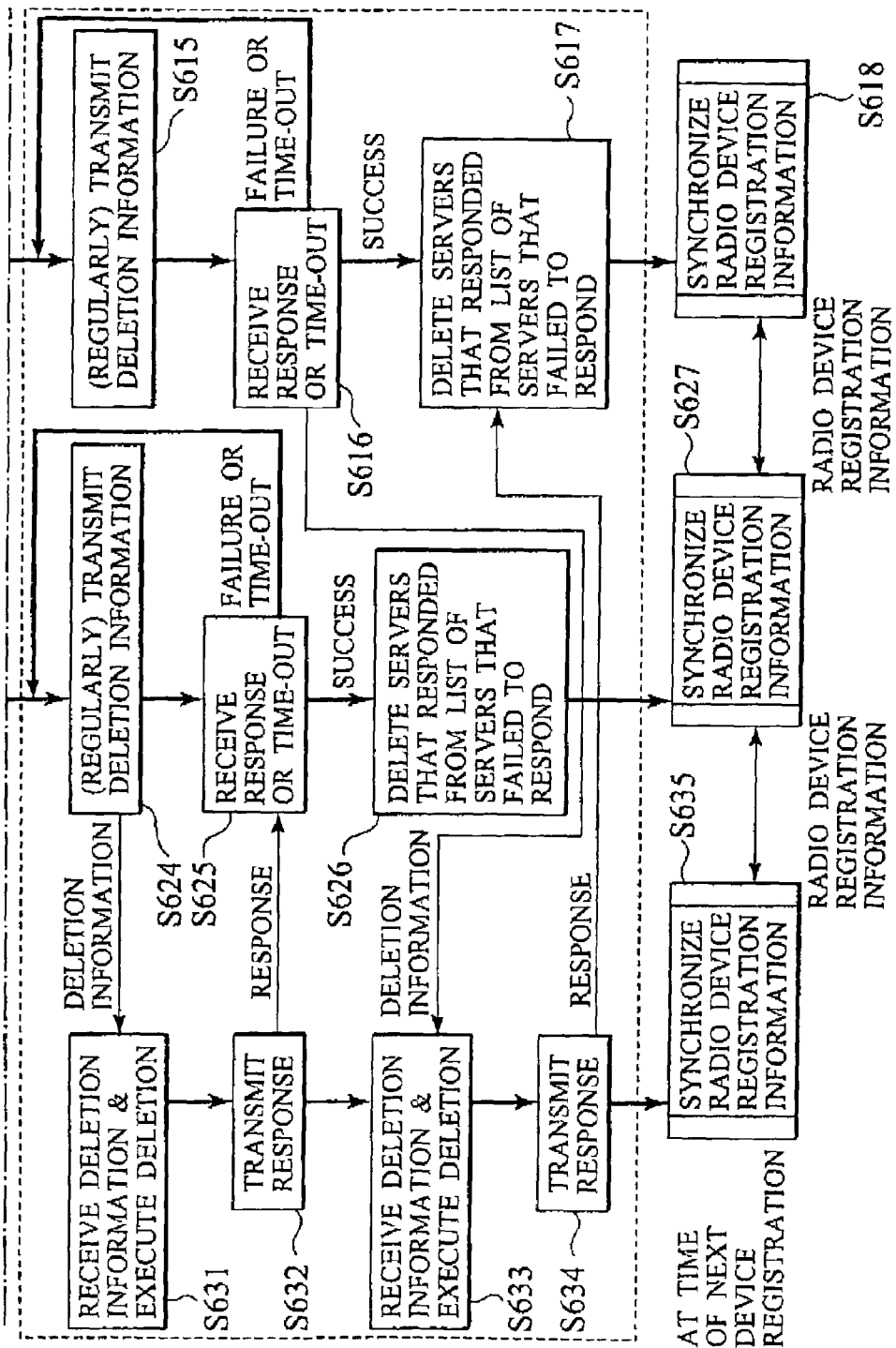

RADIO NETWORK SYSTEM USING MULTIPLE AUTHENTICATION SERVERS WITH CONSISTENTLY MAINTAINED INFORMATION

BACKGROUND OF THE INVENTION

1. Field of the Invention

The present invention relates to a radio network system, a radio network management method, and a radio network management program executable on a computer, and more particularly, to a technique to be used for managing devices in a radio network system in which communications are protected by authentication or encryption.

2. Description of the Related Art

In recent years, in conjunction with the advance of the LAN (Local Area Network) technique. The networking in the office environment has been developed mainly in forms of connections among PCs (Personal Computers). While such wired LANs are spreading, the use of the wireless LAN in which a part of the wired LAN is replaced by radio is also in progress. For example, a radio base station is connected to the wired LAN and a plurality of portable PCs are connected to this base station by radio. When a file of a desk-top PC connected to the wired LAN by Ethernet is edited from the portable PC, the radio access to the wired LAN is realized. Also, when portions of the base station and the portable PC are extracted, these portions form a wireless LAN. The advantages of such a wireless LAN are that there is no need to lay cables because radio waves or infrared rays are used as transmission paths, and that a new construction or a layout change of the network is easy.

The introduction of such a wireless LAN is becoming popular due to the standardization of IEEE 802.11. In IEEE 802.11, the 2.4 GHz band wireless LAN specification was completed in 1997, and the 5 GHz band wireless LAN specification was completed in 1999. The transmission rate of the 2.4 GHz band wireless LAN specification is either 1 to 2 Mbps or 11 Mbps, and the specification with the transmission rate over 20 Mbps is currently under the discussion. Recently, products compatible with this 2.4 GHz band specification have been released by many companies so that the base station and the radio PC card are now priced in an affordable range of general users. On the other hand, the 5 GHz band wireless LAN specification can realize the transmission rate of 20 to 30 Mbps. Also, unlike the 2.4 GHz band, 5 GHz band is currently almost unused frequency band in which faster transmission rates can be expected easily, so that it has a prospect of becoming the next generation wireless LAN specification. With the appearance of some venture company that plans to sell one chip at $35 in 2001, 5 GHz band is now becoming familiar.

In addition, there is a trend to install the Bluetooth on all kinds of devices in a variety of fields including those of portable telephones, home electronics and PCs. This Bluetooth is also a 2.4 GHz band radio system, and it is expected to spread worldwide due to its low cost of about $5 for one chip, its wide acceptance by approximately 2000 companies in a variety of fields and its standardization activity that has been made in direct connection with the product developments.

From the circumstances described above, as radio devices are spread, the range of application of these techniques is expected to cover not just the office environment but also the general homes as well. In particular, the fact that there is no need to lay cables in the home is even greater advantage than the case of the office environment.

However, despite of the fact that the operation by radio is easy, its feature that it does not use an explicit connection such as that used in the case of the cable connection or the like tends to give rise to the problem of security and privacy. There is a possibility for having the radio device controlled from outside the home without consent, or a possibility for having the personal information stolen or destroyed. The internet connection is now shifting from a part time basis to a tall time basis, but when it becomes popular to keep the power of the PC having a radio network interface constantly on as a result, there is also a possibility for allowing an intrusion into the PC via the radio network interface by evading the firewall.

Also, the general home users are likely to experience some vague anxiety because of the circumstances in which the hone users can learn some knowledge about the presence of threats related to the security such as eavesdropping and pretending, through news related to the computer virus from the PC industry or TV programs. Under the business environment, it is relatively easy to take measures against these threats by hiring a specialist, and it is possible to implement the IPSEC or firewall and continually updating such software. However, under the home environment, it is expected to be rather difficult for many users to take such measures in general.

In order to enable the users to use the network of radio devices in the home without anxiety, there are attempts to use a method for distributing secret information to be used for the authentication from an authentication server installed in the home. However, if a radio device that received the secret information once is allowed to use the same secret information indefinitely, the user cannot hand over the radio device to someone else or discard the radio device without anxiety. Also, when one radio device is stolen, there is a possibility for having all the radio communications in the home eavesdropped by using the secret information maintained by that device.

When the communications within the network are to be protected by the above described method, it is presupposed that there is only one authentication server. However, when there is only one authentication server, there arises a problem that all the information regarding the radio devices can be lost when this authentication server fails. It is possible to prevent the information from being lost even when one authentication server falls if two or more authentication servers are provided and the information regarding the radio devices is shared among them. However, in the radio communications, there are many cases where the communications become temporarily impossible due to various conditions, so that it is not necessarily always possible to synchronize the information among the authentication servers. For this reason, it is difficult to guarantee that the information is always the same among the authentication servers.

BRIEF SUMMARY OF THE INVENTION

It is therefore an object of the present invention to provide a radio network system, a radio network management method, and a radio network management program capable of maintaining the consistency in the information of devices existing in the network and improving the reliability and the safety of communications within the network even in the case of using a plurality of authentication servers in the network.

According to one aspect of the present invention there is provided a method for managing a network of radio devices using at least one authentication server, the method comprising: carrying out a registration of a first radio device at an authentication server related to the registration of the first radio device when it is possible to communicate with all other authentication servers related to the network; distributing registration information of the first radio device to the authentication servers related to the network; managing registration information of the radio devices at each one of the authentication servers related to the network: carrying out a deletion of a second radio device at an authentication server related to the deletion of the registration of the second radio device; distributing deletion information of the second radio device to the authentication servers related to the network; and deleting the second radio device from the registration information of the radio devices according to the deletion information of the second radio device at each one of the authentication servers related to the network.

According to another aspect of the present invention there is provided a method for managing a network of radio devices using at least one authentication server, the method comprising: requesting connections from a registration target authentication server which is an authentication server for carrying out a registration of a new radio device, to other authentication servers related to the network; establishing a synchronization of information regarding the registration of the radio devices related to the network, from the registration target authentication server to the other authentication servers when responses to requests from all the other authentication servers are received; acquiring registration information which is information of the new radio device related to the registration at the registration target authentication server: transmitting the registration information from the registration target authentication server to the other authentication servers; judging whether all the other authentication servers have received the registration information at the registration target authentication server; notifying registration completion from the registration target authentication server to all the other authentication servers according to judgement at the judging step; and registering the registration information of the new radio device related to the registration at the registration target authentication server and the other authentication servers.

According to another aspect of the present invention there is provided a method for managing a network of radio devices using at least one authentication server, the method comprising: deleting information of a first radio device to be deleted from registration information of the radio devices at a deletion accepting authentication server which is an authentication server that acquired deletion information for deleting the information of the first radio device from the network; transmitting the deletion information from the deletion accepting authentication server to other authentication servers related to the network; sending a response from a deletion information receiving authentication server which is one of the other authentication servers that received the deletion information, to the deletion accepting authentication server; deleting the information of the first radio device from the registration information of the radio devices according to the deletion information, at the deletion information receiving authentication server; generating a list of deletion information non-receiving authentication servers which are authentication servers that failed to respond and re-transmitting the deletion information to the deletion information non-receiving authentication servers, at the deletion accepting authentication server; and deleting the information of the first radio device from the registration information of the radio devices at each deletion information non-receiving authentication server.

According to another aspect of the present invention there is provided an authentication server device for managing a network of radio devices, comprising: a communication unit configured to carry out communications with authentication servers related to the network; a radio device information storing unit configured to store information of radio devices connected to the network; a radio device information registration unit configured to carry out a registration of information regarding a radio device to be connected to the network with respect to the radio device information storing unit when it is possible to carry out communications with all the authentication servers; a radio device information registration information delivery unit configured to deliver information regarding the registration of a radio device to the authentication servers by using the communication unit; a deletion unit configured to delete the information of a radio device from the radio device information storing unit when a deletion of a radio device is to be carried out; and a radio device deletion information delivery unit configured to distribute information regarding the deletion of a radio device to the authentication servers by using the communication unit.

According to another aspect of the present invention there is provided a computer program product for causing computers that manage a network of radio devices, to carry out processings including: requesting connections from a registration target authentication server which is an authentication server for carrying out a registration of a new radio device, to other authentication servers related to the network; establishing a synchronization of information regarding the registration of the radio devices related to the network, from the registration target authentication server to the other authentication servers when responses to requests from all the other authentication servers are received; acquiring registration information which is information of the new radio device related to the registration at the registration target authentication server; transmitting the registration information from the registration target authentication server to the other authentication servers; judging whether all the other authentication servers have received the registration information at the registration target authentication server; notifying registration completion from the registration target authentication server to all the other authentication servers according to judgement at the judging step; and registering the registration information of the new radio device related to the registration at the registration target authentication server and the other authentication servers.

According to another aspect of the present invention there is provided a computer program product for causing computers that manage a network of radio devices, to carry out processings including: deleting information of a first radio device to be deleted from registration information of the radio devices at a deletion accepting authentication server which is an authentication server that acquired deletion information for deleting the information of the first radio device from the network; transmitting the deletion information from the deletion accepting authentication server to other authentication servers related to the network: sending a response from a deletion information receiving authentication server which is one of the other authentication servers that received the deletion information, to the deletion accepting authentication server: deleting the information of the first radio device from the registration information of the radio devices according to the deletion information, at the deletion information receiving authentication server; generating a list of deletion information non-receiving authentication servers which are authentication servers that failed to respond, and re-transmitting the deletion information to the deletion information non-receiving authentication servers, at the deletion accepting authentication server; and deleting the information of the first radio device from the registration information of the radio devices at each deletion information non-receiving authentication server.

Other features and advantages of the present invention will become apparent from the following description taken in conjunction with the accompanying drawings.

BRIEF DESCRIPTION OF THE DRAWINGS

FIGS. 5A and 5B are a flow chart for operations of authentication servers at a time of registering a radio device in one embodiment of the present invention.

FIGS. 6A and 6B are a flow chart for operations of authentication servers at a time of deleting a radio device in one embodiment of the present invention.

DETAILED DESCRIPTION OF THE INVENTION

Referring now to FIG. 1 to FIG. 9, one embodiment of a radio network system, a radio network management method, and a radio network management program according to the present invention will be described in detail.

Figure 1:
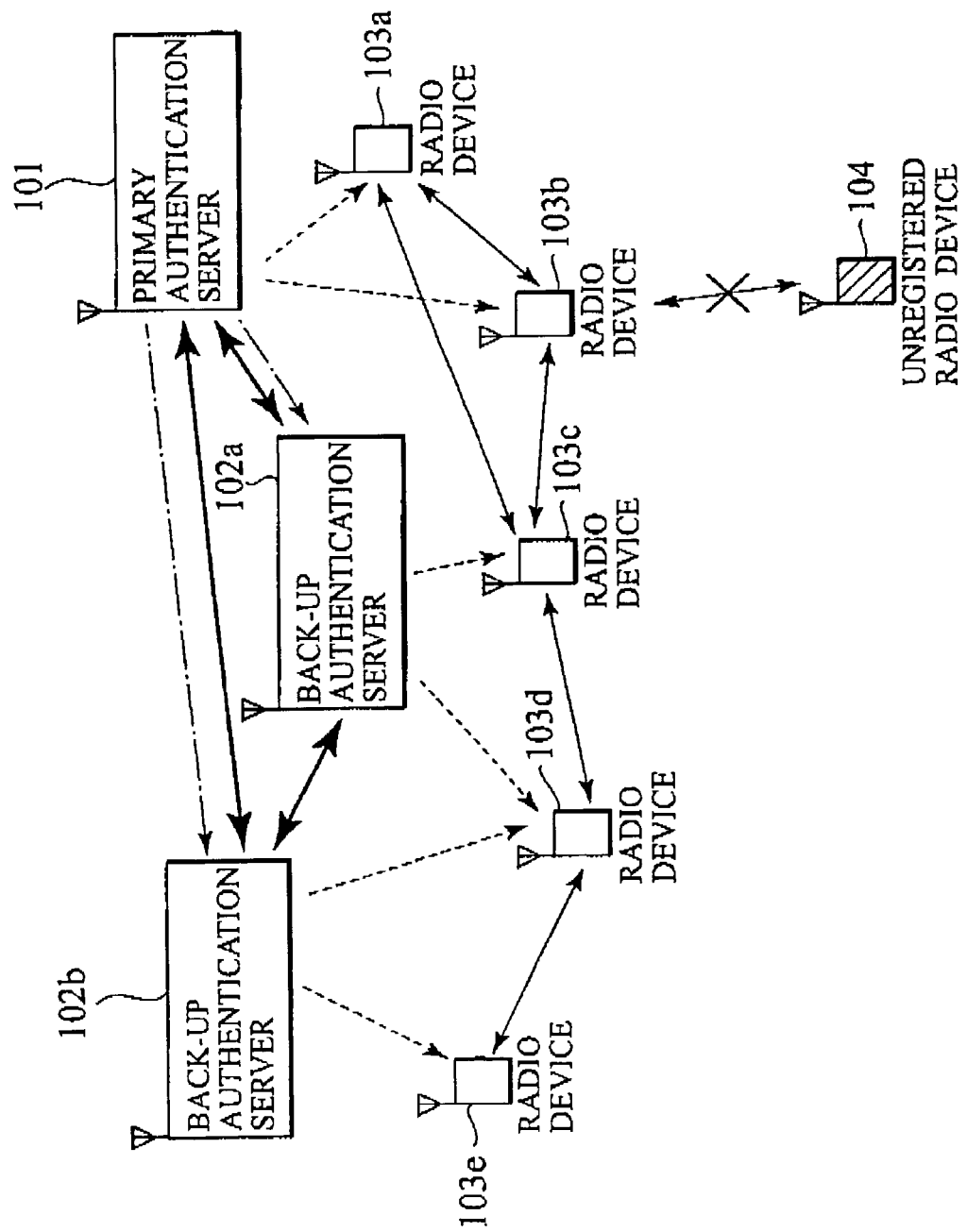
FIG. 1 is a schematic diagram showing an exemplary configuration of a network according to one embodiment of the present invention.

FIG. 1 illustrates the server authentication method using the radio network system of this embodiment. As shown in FIG. 1, in this embodiment, the authentication servers in the radio network system include a primary authentication server 101 and two back-up authentication servers 102a and 102b. There are also a plurality of radio devices 103a to 103e.

In terms of the hardware configuration, each authentication server can be an authentication server having functions described below, which can be provided in a form of an ordinary computer equipped with a CPU for carrying out various processings, an input device such as keyboard, mouse, light pen or flexible disk device, an external memory device such as memory device or disk device, and an output device such as a display device or a printer device, for example. This computer system may be the so called general purpose computer, the workstation, or the personal computer, but it is not limited to these, and it is also possible to provide a dedicated system having the above functions. The processings to be described below can be realized by installing a software having programs for the processings to be described below into this computer system and executing that software.

The authentication server of this embodiment also has a unit for carrying out communications with the radio devices or the other authentication servers. This unit can be provided in a form of a radio PC card or a wireless LAN card. It is also possible to use the Bluetooth. Also, a network used in this embodiment is a network to which devices such as computers can be connected, which can be provided in a form of a LAN (Local Area Network) to be used inside the office or the home in particular.

Here, the primary authentication server 101 and the back-up authentication servers 102 will be described. The authentication server that is set up on that network by the user first will be referred to as the "primary authentication server". In the case where the user sets up only one server, this one server is the primary authentication server. The second and subsequent authentication servers that are set up by the user will be referred to as the "back-up authentication servers". A plurality of authentication servers including the primary authentication server 101 and the back-up authentication servers 102 are set up on the same network, and the communications among the radio devices are encrypted by using the common key that is distributed by these authentication servers.

Next, a server key will be described. The primary authentication server 101 generates a key to be used for encrypting communications among the authentication servers including the primary authentication server aria the back-up authentication servers. In this embodiment, this key is referred to as a server key. The generated server key is distributed from the primary authentication server 101 to the back-up authentication servers 102 (as indicated by chain lines in FIG. 1). In this way, all the authentication servers within the same network will use the same server key.

Next, an identifier of the authentication server will be described. The authentication server of this embodiment has an identifier that is unique within the network. For example, it can be an identifier that is unique among all the authentication servers. More specifically, the identifier can be given at a time of manufacturing as a set of the manufacturing company name, the product name, and the product serial number. Each authentication server has a region for storing the identifiers of all the other authentication servers existing in the same network in this embodiment, a region for storing the identifiers of the other authentication servers will be referred to as an authentication server list. Because this authentication server list for storing the authentication server identifiers is provided, the authentication server can comprehend what other authentication servers are existing in that network.

Next, the generation of the common key at the authentication server will be described. The primary authentication server 101 generates a "seed" for generating the common key. This generated seed is distributed to the back-up authentication servers (as indicated by chain lines in FIG. 1), and each authentication server generates the common key by using this seed. The generation of the seed is preferably carried out regularly, such that the security can be improved further by appropriately updating the seed. Note that the "seed" is distributed in an encrypted form by using the above described "server key" in order to encrypt the communications.

Next, the distribution of the common key by the authentication servers will be described. In this embodiment, in the case where the user sets up two or more authentication servers, the distribution of the common key is carried out by all the authentication servers (as indicated by dashed lines in FIG. 1). The radio device at which the update of the common key is necessary may be enabled (allowed) to receive the distribution of the key from any authentication server. When this radio device carries out communications with the other radio device by using the common key, even it the correspondent radio device has received the distribution of the key from another authentication server, the values of the common key at the two radio device will coincide because the authentication servers on the same network must generate the same common key as described above.

Because the distribution of the common key can be done at a plurality of the authentication servers, it becomes possible to carry out the distribution of the common key more smoothly when the number of the authentication servers is increased. That is, a zone within which radio communications are possible is limited for a single authentication server, so that when it is desired to use the radio device outside of that zone, there is a need for the user to explicitly move the authentication server or the radio device so as to receive the update of the common key at the radio device. If this is forgotten, the common key distributed to the radio device will not be updated and there is a possibility for the valid period of the common key to expire. However, when an authentication server is additionally set up within a zone at which the radio communication with that radio device is possible, it becomes possible for this radio device to receive the update of the common key in its usual state of use.

The authentication servers existing in the same network carry out the generation of the common key by using the same seed generated by the primary authentication server and distribute that common key to the radio devices 103 at a prescribed timing (as indicated by dashed lines in FIG. 1). By this distribution of the common key, the radio devices 103 can carry out the authentication and the cipher communications by using that common key (as indicated by thin solid lines in FIG. 1).

Also, an unregistered radio device 104 to which the common key has not distributed yet does not possess the common key so that even if information encrypted by using the common key is acquired. It is impossible to decrypt that information. In this way, the security within the network can be improved (enforced). Here, it cannot be denied that there is a possibility for the unregistered radio device 304 to acquire that common key. There are cases where the radio device 104 acquires the common key for some reason, and in such cases it becomes possible for the radio device 104 to carry out communications within that network. In view of such cases, it is preferable to regularly change that common key. In this case, there is a need to change the common key simultaneously at all the registered radio devices 103.

Here, the distribution can be done by using the same method (algorithm) for carrying out the generation of the common key at all the authentication servers. To this end, the distribution of the common key is carried out by establishing synchronization among the authentication servers. As a method for carrying out the distribution by establishing the synchronization, the timing of the key generation can be synchronized by using the built-in timer of the authentication server. This can be done by using the built-in timer of the primary authentication server 101, for example, or the built-in timers of each of the authentication servers can be set in advance and the distribution of the common key is carried out at a prescribed timing. In this case, the average value among the authentication servers can be used as the time within the network.

In this way, the common key generated at the same timing by some authentication server in the same network becomes the same key as that generated by any other authentication server, so that it becomes possible for the radio devices to carry out the cipher communications while updating that common key at a prescribed period.

Next, the communications between the authentication server and the radio device will be described. In the case where it is desired to separate some radio device from the network, it suffices to interrupt the update of the secret information with respect to that radio device. However, in order to make it possible to separate a specific device in this way, there is a need to register information for identifying each individual radio device at the authentication servers. Also, in order to encrypt the communication at time of distributing the common keys, another piece of secret information may be given individually to each radio device, such that the secret information is shared between the authentication server and only one radio device. In the following, the former secret information which is to be regularly updated will be referred to as a "common key". While the latter secret information will be referred to as a "master key".

Figure 2:
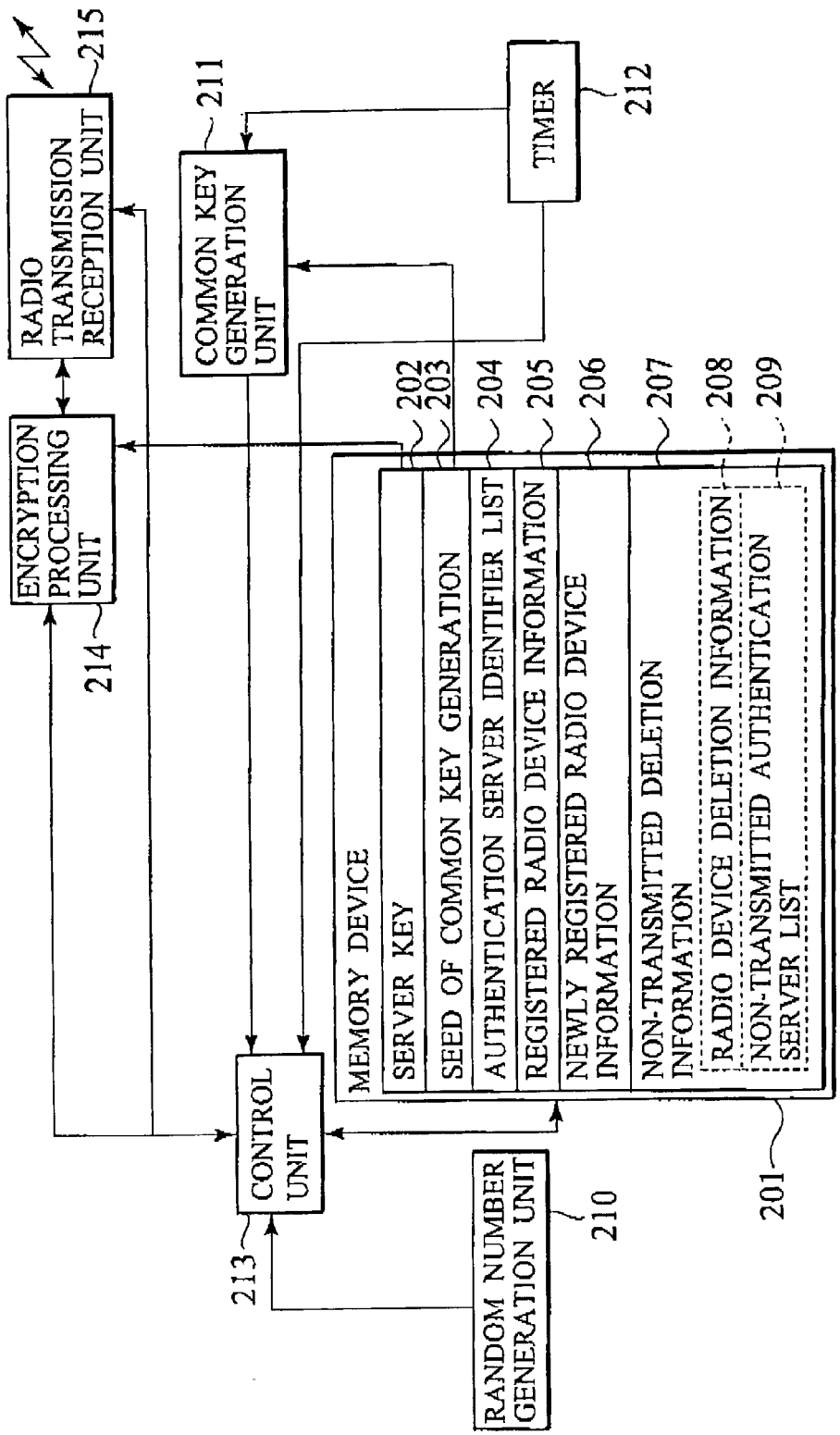
FIG. 2 is a block diagram showing a configuration of an authentication server according to one embodiment of the present invention.

FIG. 2 shows a configuration of the authentication server in this embodiment. In this authentication server, a memory device 201 has a region 202 for storing the above described server key, a region 203 for storing a seed for generating the server key or the common key, a region 204 for storing the authentication server identifier list, a region 205 for storing the registered radio device information, a region 206 for temporarily storing newly registered radio device information to be used by the radio device registration procedure to be described below, and a region 207 for storing a non-transmitted deletion information which is information regarding device deletion that is not yet transmitted. This region 207 for storing the non-transmitted deletion information contains a region 208 for storing a radio device deletion information and a region 209 for storing the non-transmitted authentication server list.

A random number generation unit 210 generates a random number. This random number generation unit 210 is used not only for the purpose of generating the seed of the server key or common key generation when this authentication server operates as the primary authentication server, but also for the purpose of generating various keys at a time of carrying out the radio device registration.

The seed of the common key generation is generated by a common key generation unit 211, and a timing of the key generation may be controlled by a built-in timer 212 of the authentication server. The time information from the timer 212 is also used for various time-out judgements as well as for the determination of timings for regular attempts at a time of the device deletion to be described below.

A control unit 213 controls an encryption processing unit 214 and a radio transmission/reception unit 215 according to various information from the above described elements of the authentication server, and carries out communications with the other authentication servers and the radio devices while encrypting the communications according to the need.

The encryption processing unit 214 encrypts data for which a communication request is made from the control unit 213. The encryption processing unit 214 also receives the encrypted data transmitted from outside of this authentication server and decrypt them. The decrypted data are stored at a prescribed position in the memory device 201. This encryption processing unit 214 encrypts data to be transmitted by using the server key stored in the memory device 201, and decrypts received data by using this server key.

The radio transmission/reception unit 215 transmits data encrypted at the encryption processing unit 214 by radio. Also, the radio transmission/reception unit 215 receives encrypted data transmitted from outside of this authentication server and give these data to the encryption processing unit 214. Note that, in this embodiment, the communications among the servers are realized in forms of the radio communications by the radio transmission/reception unit 215, but the present invention is not limited to this case, and the communications among the servers may be realized in forms of wired communications using Ethernet cables or the like.

Figure 3:
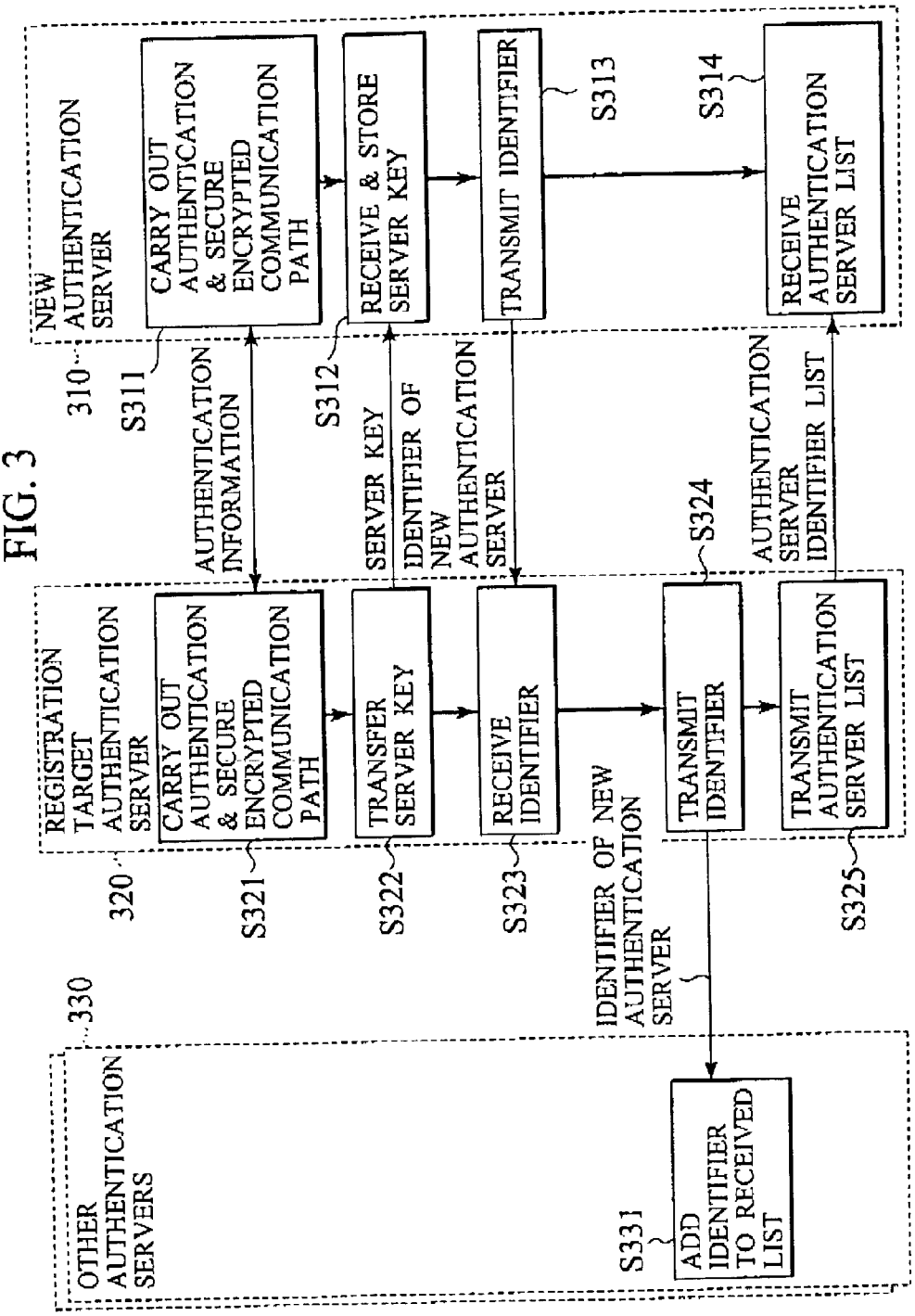
FIG. 3 is a sequence chart showing a procedure for adding a back-up authentication server in one embodiment of the present invention.

FIG. 3 shows a procedure for the authentication server registration in this embodiment. Here, the registration of the authentication server will be described. When the user sets up the primary authentication server, no other authentication server exists on the same network yet, so that only the generation of the server key and the "seed" is carried out as the registration operation. When the user newly sets up a back-up authentication server, the registration operation for the new authentication server with respect to the existing authentication server is carried out. Here, the existing authentication server with respect to which the user carries out the registration operation can be either the primary authentication server or another back-up authentication server. Here, the authentication server for registering the new authentication server will be referred to as a registration target authentication server. Note that this registration target authentication server can be either the primary authentication server or a back-up authentication server as mentioned above.

First, this registration target authentication server 320 notifies the registration of the new authentication server 310 to the other authentication server 330. The operation to be carried out by the user in this registration operation is the operation on the screen to indicate that the user intends to register a new back-up server to the registration target authentication server. It is also possible to carry out the authentication operation necessary in establishing the reliable relationship between the registration target authentication server 320 and the new authentication server 310. This authentication operation includes the input of a PIN code, for example (step S321). The new authentication server 310 responds to requests from the registration target authentication server 320, provides the authentication information or the like, and establishes the communication path (step S311). Here, the communication path should preferably be encrypted.

When the registration operation is carried out, the registration target authentication server transfers the server key to the new authentication server 310 (step S322). Then, the new authentication server 310 receives the server key, and stores that server key (step S312). Next, the new authentication server 310 transmits its own identifier to the registration target authentication server 320 (step S313). The registration target authentication server 320 receives that authentication server identifier from the new authentication server 310 (step S323), and transmits that new authentication server identifier to the other authentication server 330 existing in the network (step S324). Here, the transmission is made by applying the encryption using the server key. The other authentication server 330 receives the identifier of the new authentication server 310, and adds that identifier to the authentication server list. In this way, all the authentication servers have the latest information regarding what other authentication servers are existing in the network.

Next, the registration target authentication server 320 transmits the authentication server list to the new authentication server 310. The new authentication server 310 receives the authentication server list, and stores and maintains that authentication server list in a prescribed position (step S314). In this embodiment, the identifier of the new authentication server 310 is transmitted from the registration target authentication server 320 to the other authentication server 330, but the present invention is not limited to this case, and it is also possible to create a list of all the authentication servers existing in the network including the new authentication server first, and then transfer this list to all the other authentication servers, for example. It is also possible to directly transmit the identifier from the new authentication server 310 to all the authentication servers connected to that network.

Figure 4:
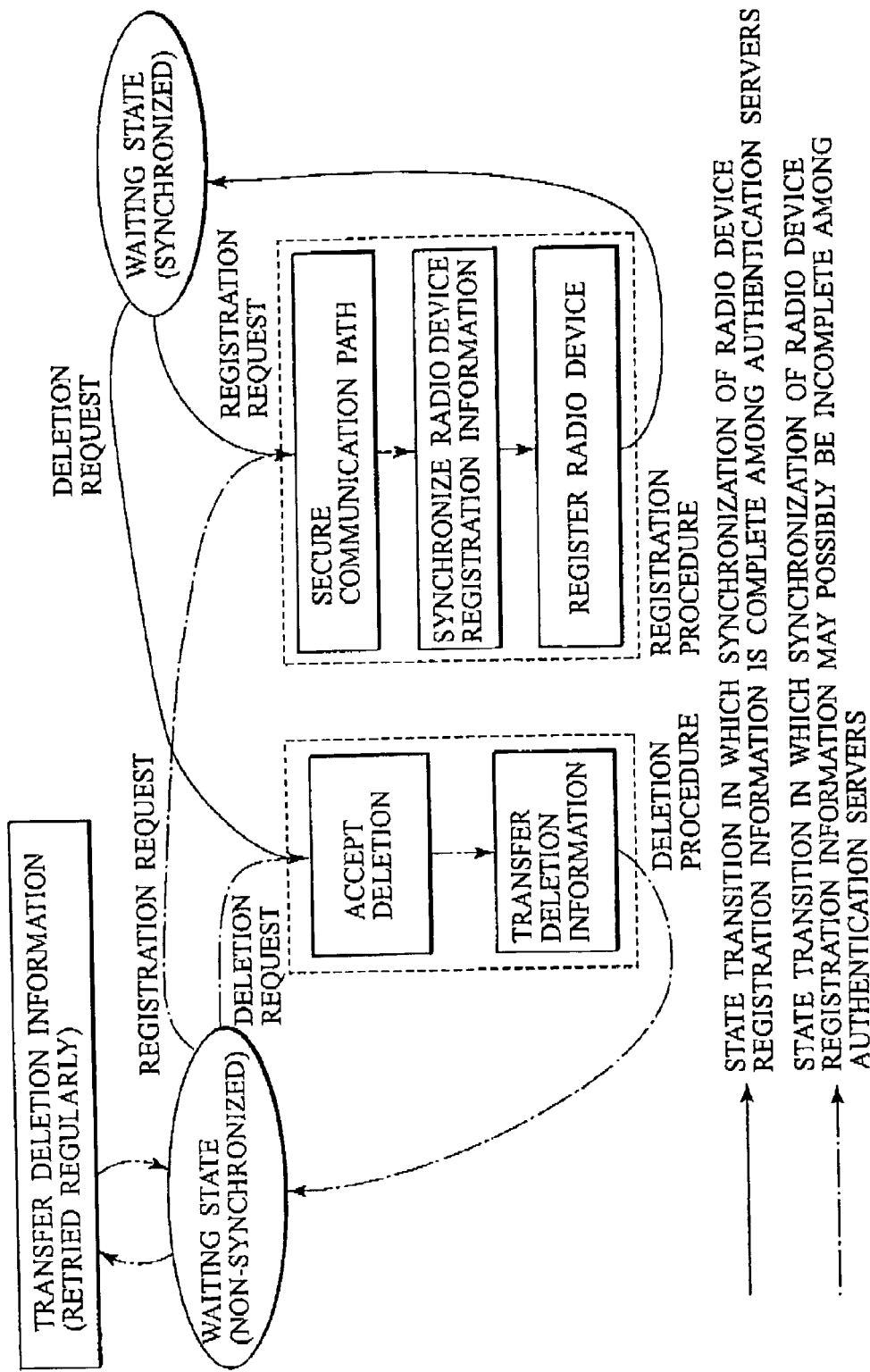
FIG. 4 is a diagram showing a state transition of authentication servers in cases of carrying out a registration and a deletion of a radio device in one embodiment of the present invention.

FIG. 4 shows state transitions of the authentication servers in conjunction with the registration and the deletion of the radio device. FIG. 4 shows transitions between a state where the radio device registration information is synchronized among a plurality of authentication servers and a state where the radio device registration information is riot synchronized among a plurality of authentication servers, rather than states of a single authentication server. In FIG. 4, solid lines indicate state transitions in which the synchronization of the radio device registration information is complete among the authentication servers, and chain lines indicate state transitions in which the synchronization of the radio device registration information may be incomplete among the authentication servers. The operation to newly register or delete ae radio device may be carried out by any authentication server, i.e., either one of the primary authentication server and the back-up authentication server.

When the radio device registration or deletion is carried out, the registration information is changed, so that there is a need to take care to avoid loss of information in such a way that the consistency of the registered contents among the authentication servers cannot be recovered. This embodiment uses a procedure in which the registered contents coincide at a timing of the radio device registration. On the other hand, at a time of the radio device deletion, there can possibly be cases where it is desired to delete that radio device as quickly as possible because that radio device has been stolen, the quick execution of the device deletion is given a higher priority over the guarantee of the consistency. To compensate for that, it is made such that the consistency will be recovered by the time of the next radio device registration.

Suppose that the authentication server is in the waiting state (synchronized) on the right side of FIG. 4. Here, when there is a registration request from some radio device, this authentication server receives that registration request and executes the registration procedure. First, the communication path with the other authentication server is established, the synchronization of the radio device registration information is established with the other authentication server, and then the registration of the radio device is carried out. After the registration, it returns to the waiting state.

Next, when there is a deletion request from some radio device, this authentication server accepts the deletion request from the radio device, and transfers that information to the other authentication servers. After accepting the deletion, there can be cases where the radio device registration information becomes different from the other authentication servers, so that the synchronization of the radio device registration information can be regarded as incomplete among the authentication servers in that sense. Consequently, the subsequent transitions are indicated by chain lines. After transferring the radio device deletion information, it becomes a waiting state (non-synchronized). Here, the non-synchronized means that the synchronization of the radio device registration information among the authentication servers may possibility be incomplete.

Here, the authentication server to which this deletion request was made and the other authentication server that received the deletion information carry out the transfer of the deletion information to the other servers. It is preferable to retry this transfer regularly. The authentication server in this waiting state (non-synchronized) will remain in the non-synchronized state until the next registration request is made and the synchronization of the radio device information is established. In the following, the radio device registration and deletion will be described in further detail.

FIGS. 5A and 5B show the radio device registration procedure by the authentication servers in this embodiment. Here, the operations of a registering radio device 510, a registration target authentication server 520 that accepts this registration, and other authentication servers 530 will be described.

First, the registration target authentication server 520 checks that there is no other registration operation in progress (step S521). When another registration operation is in progress, this fact should have been notified to each authentication server by a procedure to be described below, so it is checked whether there was such a notification or not. If another registration operation is in progress, this fact will be notified to the user and the new registration operation will not be started.

When there is no other registration operation in progress, the registration target authentication server 520 attempts to start communications with all the other authentication servers existing in the network, and requests responses (step S522). After waiting for a time-out of several seconds, if there is at least one authentication server from which a response is not received or with which a communication cannot be carried out normally, the registration failure is notified to the user and the registration operation is interrupted. Also, when a problem in the communication with the other authentication server is detected in a process of the following registration procedure and it cannot be recovered in short time, the registration failure is notified to the user and the registration operation is interrupted.

The other authentication server 530 that received the connection request transmits a response (step S531). When the response is received, the registration target authentication server 520 carries out the notification of the registration start to the other authentication server 530 next (step S523), and the other authentication server 530 receives the registration start notice (step S532). Next, the synchronization of the radio device registration information among the servers is established (step S524). This can be realized by establishing the synchronization of the radio device deletion information, for example. The radio device deletion procedure will be described below.

When this synchronization operation is completed, all the authentication servers have the radio device registration information of the same content. When the synchronization of the radio device registration information fails, the registration is interrupted and the registration failure is notified to the user (step S529).

Next, the registration target authentication server 520 executes a series of procedures for carrying out the radio device registration with respect to the registering radio device 510, such as authentication procedure, generation and transmission of a master key unique to the device, transmission of the common key, and acquisition of information regarding the radio device (step S525). Here, the same procedure as in the case where there is only a single authentication server can be used. The radio device 510 that received various keys and the registration information maintains this information (step S511).

Next, the master key generated here and the information regarding the radio device acquired here are transmitted to all the other authentication servers 530 by encrypting them by using the server key (step S526). The other authentication server 530 that has received these informations records them into a temporary memory region and transmits a response to the registration target authentication server 520 (step S534).

Next, the registration target authentication server 520 judges whether responses are received from all the authentication servers or not (step S527). If the responses are received from all the authentication servers, a registration complete notice is transmitted to all the other authentication servers (step S528). On the other hand, if there is no response from at least one of the other authentication servers 530 even after a prescribed period of time $T_1$ has elapsed, the registration is interrupted and the registration failure is notified to the user (step S529).

After storing the registration information temporarily, the other authentication servers 530 are set in a state for waiting the registration complete notice from the registration target authentication server 520 (step S535). When the registration complete notice is received, the other authentication server 530 adds the registration information stored in the above described temporary memory region to the information of the other registered radio devices (step S587). However, if the registration complete notice is not received before a prescribed period of time $T_2$ ($T_2 \leq T_1$ in general) since the registration start notice, the registration operation is regarded as interrupted, and the information stored in the temporary memory region is discarded (step S53). After the registration complete notice is transmitted or after the registration operation is interrupted by the time-out, any authentication server can newly start the radio device registration.

FIGS. 6A and 6B shows the radio device deletion procedure by the authentication servers in this embodiment. Here, the operations of a deletion accepting authentication server 610 that accepts the deletion of the radio device, another authentication server 620 that is possible to communicate with it at a time of accepting the deletion, and an other authentication server 630 that is impossible to communicate with it at a time of accepting the deletion will be described.

When the user carries out an operation to start the radio device deletion at some authentication server, the authentication server accepts the command for the deletion, and transfers the information regarding the deletion to all the other authentication servers that are possible to communicate with it (step S611). Here, the information regarding the deletion may include an identifier for identifying the radio device for which the deletion is commanded, or a secret key that can be used for the same role as the identifier. The authentication server that received the information regarding the deletion (deletion information) executes the deletion of that radio device (step S621).

Next, the other authentication server 620 that is possible to communicate at a time of the deletion transmits a response indicating that the deletion information is accepted (step S622), and the deletion accepting authentication server 610 receives the response (step S612). Then, the deletion accepting authentication server 610 judges whether there is any authentication server from which there is no response or not (step S613). For this judgement, the authentication server that failed to respond can be identified by comparing the authentication servers that responded with a list of all the authentication servers existing in the network, for example. When there is more than one authentication servers that failed to respond, a list of identifiers of these authentication servers is formed and it is transferred to the authentication servers that are possible to communicate currently, along with the information regarding the deletion (step S614).

The other authentication server 620 that is possible to communicate at a time of the deletion receives the list of the authentication servers that failed to respond (step S623), and regularly makes an attempt to notify the information regarding the deletion to each authentication server on that list until it succeeds (step S624). This list of authentication servers that failed to respond may be provided in a form of a list of identifiers of the servers, for example. When there is an authentication server which becomes possible to start communicating in a process of this attempt, that authentication server receives the deletion information and executes the deletion (step S632), and then makes a response indicating the deletion. The other authentication server 620 that is possible to communicate at a time of the deletion receives that response (step S625).

This transfer of the list of the authentication servers that failed to respond is carried out regularly. As for the authentication server from which the response is received, the identifier of that authentication server is deleted from the list of identifiers sequentially, and if the list of identifiers becomes empty as the responses are received from all the authentication servers, the deletion information associated with that list is also deleted from the memory region (step S626). On the other hand, the deletion accepting authentication server 610 also regularly transmits the deletion information as described above (step S615), and when there is a response from the other authentication server 630 that is impossible to communicate at a time of the deletion (step S616), the server that responded is deleted from the list of servers that failed to respond (step S617). Then, the synchronization of the radio device registration information will be established at a time of the next device registration (steps S635, S627 and S618).

Note that, the authentication server that receives the information in this procedure has a possibility of receiving the same information from a plurality of authentication servers in overlap, but an authentication server that receives the information for commanding the deletion of a radio device that does not exist in its list of registered radio devices will just transmit a response to the source authentication server without carrying out the deletion operation. In this way, the information regarding the deletion that is received for the second or subsequent time in overlap can be ignored.

Figure 7:
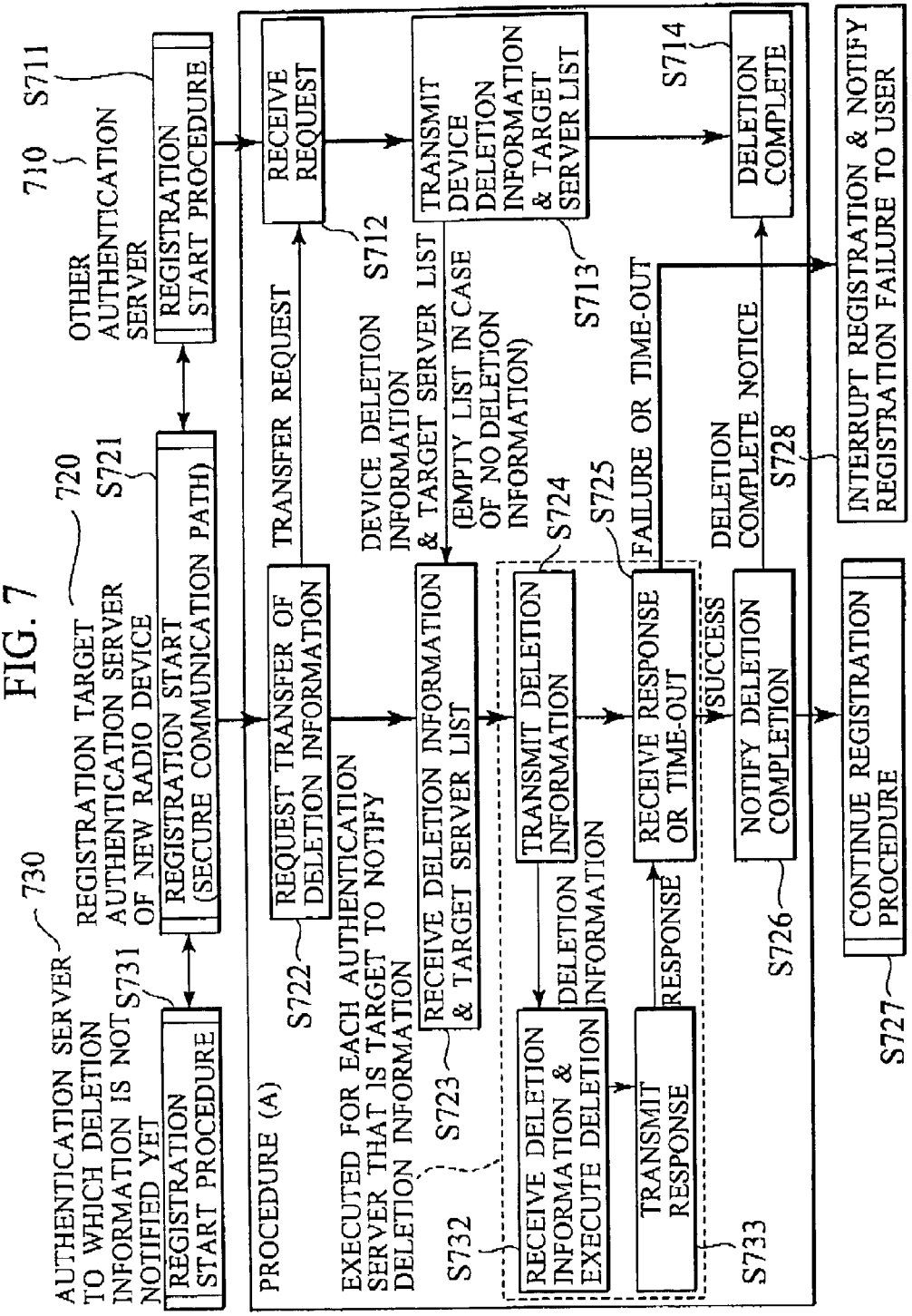
FIG. 7 is a flow chart for operations of authentication servers for synchronizing radio device registration information at a time of registering a radio device in one embodiment of the present invention.

FIG. 7 shows the operation of the authentication servers for synchronizing the radio device registration information at a time of registering the radio device in this embodiment.

Here, the information on the radio device deletion can be used as the radio device registration information described above. In this embodiment, the case of synchronizing the radio device registration information by using the information on the radio device deletion will be described.

When another radio device registration procedure is started before the notification of the information regarding the deletion is completed, the notification of the information regarding the deletion is carried out. Here, the operations of a registration target authentication server 720 of a new radio device, an authentication server 730 to which the deletion information is not notified yet, and an other authentication server 710 will be described.

First, the registration target authentication server checks that it is possible to communicate with all the authentication servers (steps S711, S721 and S731) and requests each authentication server to transmit the information regarding the deletion for which the notification is not yet completed (step S722), and the other authentication server 710 receives this request (step S712). If the other server has such information, the device deletion information and the target server list are transmitted (step S713). The registration target authentication server 720 receives them (step S723), adds them to any such information it has, and transfers them to the authentication servers to which these informations should be transmitted (step S724). The registration target authentication server 720 has already checked that it is possible to communication with all the authentication servers, so that it expects to receive the responses.

The registration target authentication server 720 of the new radio device transmits the deletion information to the authentication server 730 to which the deletion information is not notified yet (step S724). When this deletion information is received, the deletion from the radio device list is executed (step S732), and after the deletion is finished, the deletion complete notice is transmitted to the authentication server that originally had the information regarding the deletion (step S733). When this response is received (step S725), the registration target authentication server 720 of the new radio device notifies the deletion completion (step S726), and the other authentication server 710 receives that deletion complete notice (step S714). By this, the notification of the information regarding the deletion that originated from that authentication server is completed, and the next registration procedure is executed (step S727). On the other hand, if the response is not received at this point, the radio device registration procedure is interrupted (step S728).

Figure 8:
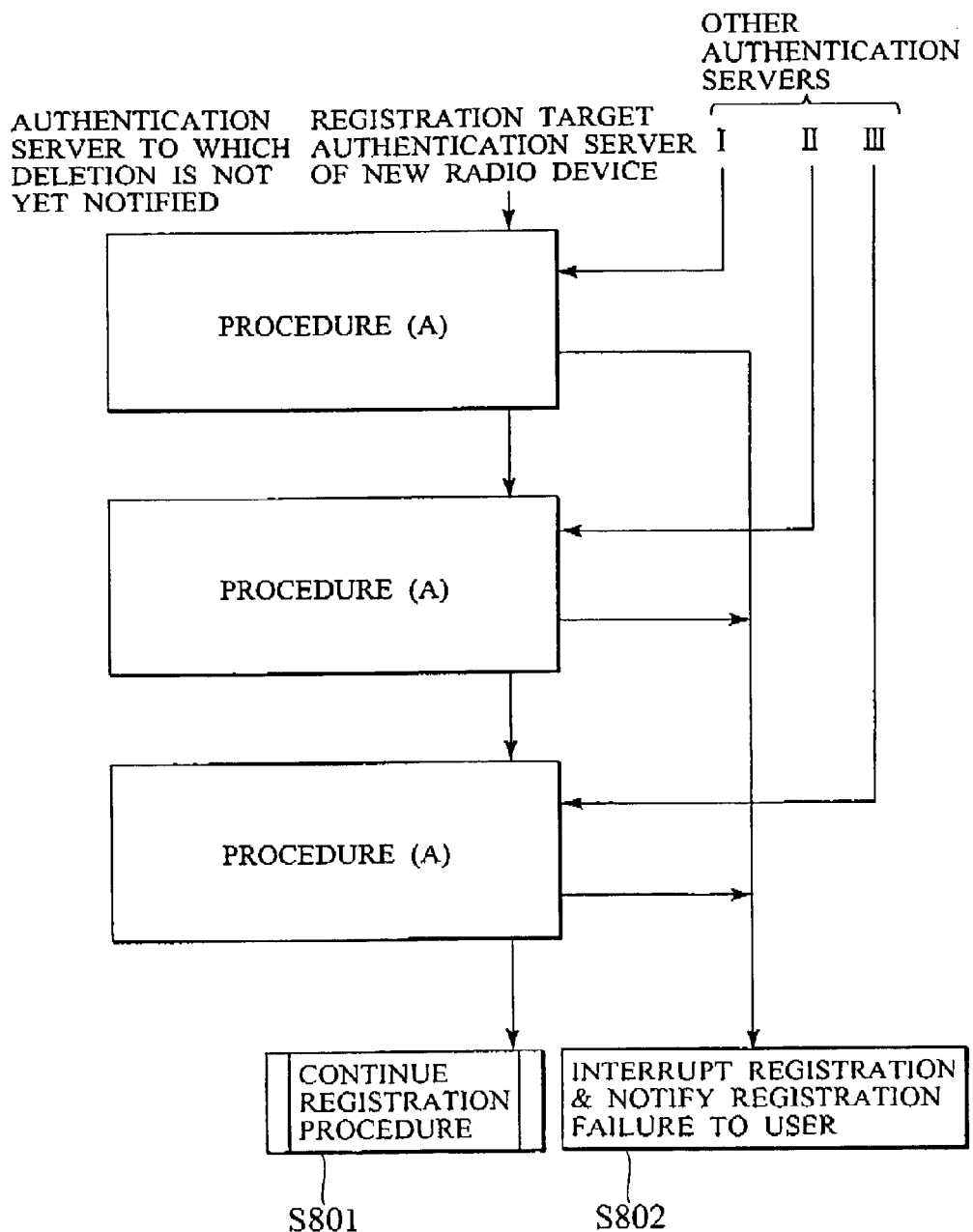
FIG. 8 is a flow chart for operations of authentication servers for synchronizing radio device registration information at a time of registering 14 radio device with a plurality of other authentication servers in one embodiment of the present invention.

FIG. 8 shows the operation of the authentication servers for synchronizing the information regarding the radio device deletion at a time of registering the radio device, in the case involving a plurality of other authentication servers. In FIG. 8, the procedure (A) indicates the procedure (A) shown in FIG. 7, which is a serves of procedures containing the steps S712, S713, S714, S722, S723, S724, S725, S726, S732, and S733). As shown in FIG. 8, when there are a plurality of other authentication servers I, II and III, the processing of the procedure (A) is carried out for the other authentication server I first, then the processing of the procedure (A) is carried out for the other authentication server II, and finally the processing of the procedure (A) is carried out for the other authentication server III. In this way, even when there are a plurality of other authentication servers, the processing can be carried out. Note that the other authentication servers I, II and III may include the registration target authentication server. It is also possible to receive all the informations from the other authentication servers, combine their contents, and then carry out the procedure (A) only once.

As described, the information regarding the radio device deletion can be shared among the authentication servers quickly. Also, it is possible for all the authentication servers to have the identical information regarding the radio devices at a time of newly accepting the radio device registration.

Figure 9:
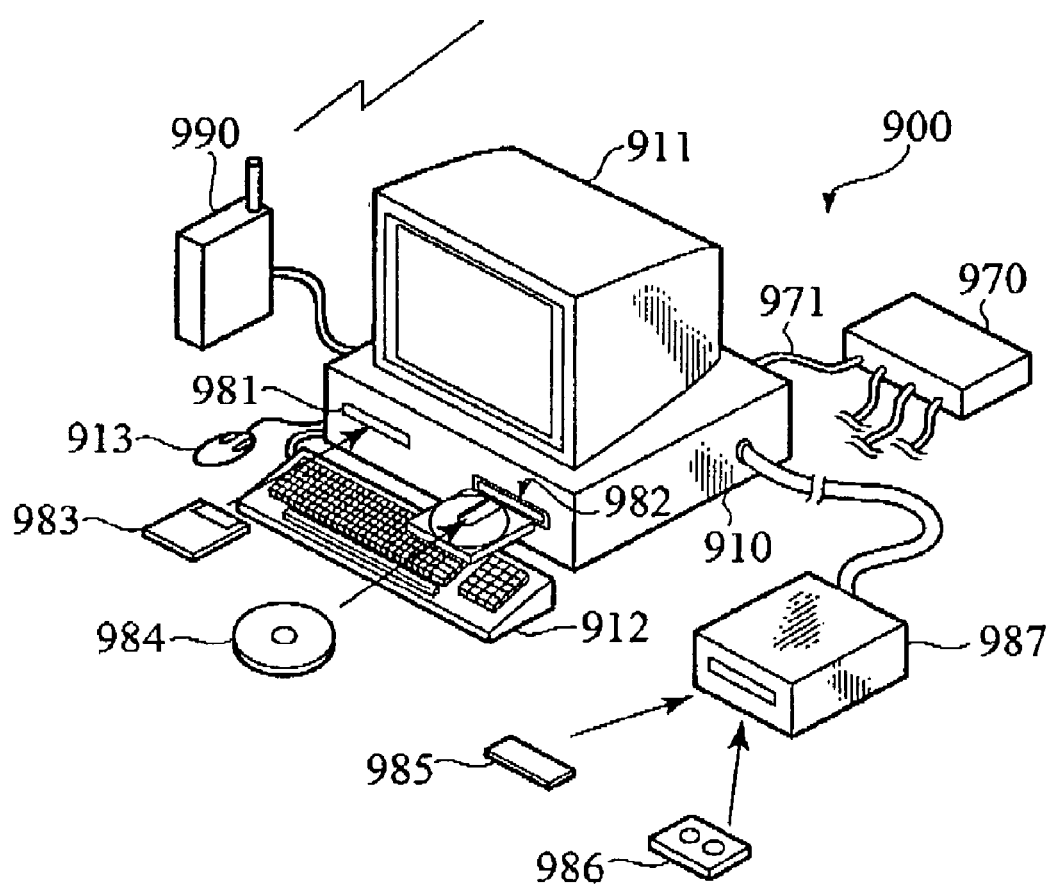
FIG. 9 is a perspective view of an authentication server device according to one embodiment of the present invention.

FIG. 9 shows an exemplary configuration of an authentication server device according to this embodiment. This authentication server device 900 has a casing 910 equipped with the CPU and the like described above, and a display device 911, a keyboard 912 and a mouse 913 that are connected to this casing 910, in this authentication server device 900, the casing 910 also has a FD (Floppy Disk) drive 981 for reading a FD 983 and a CD (Compact Disk) drive 982 for reading a CD 984. Here, the drive 982 may be a DVD (Digital Versatile Disk) drive for reading a DVD 984. Also, the authentication server device 900 has an externally attached drive 987 for reading an external memory device 985 or a tape 986 such as DAT or the like.

Various types of computer readable recording media including these FD 983, CD 984, the external memory device 985, and the tape 986 can record and maintain programs described above. The recorded programs are installed into the authentication server device 900 through these various media. In this way, the authentication server device 900 can be realized by executing these radio network programs. Note that a radio communication device 990 is used for the radio network. Also, for the purpose or communications with the other authentication servers, the authentication server device 900 is connected to a hub device 970 through a cable 971 such as that of the Ethernet or the like, so as to be connected with the other authentication server devices.

The radio network management method described above can be implemented as computer programs which can be recorded in various types of recording media described above. The user can realize the radio network management method by installing the computer programs implementing the radio network management method into a computer by using these recording media.

As described above, this embodiment uses a procedure in which the registration contents of the authentication servers coincide at a time of the radio device registration. More specifically, at a time of the registration, the communication paths to all the authentication servers in the network are secured, whether the radio device registration information is distributed to all the authentication servers or not is judged, and the registration is interrupted if there is any authentication server that failed to respond. On the other hand, at a time of the radio device deletion, the quick execution of the device deletion is given a higher priority than the guarantee of the consistency, in view of the fact that there can be cases where it is preferable to delete the radio device as quickly as possible, as in the case of the unexpected situation such as stealing of the radio device, for example. Then, the consistency is recovered before the next radio device registration.

In this way, according to the radio network management method of this embodiment, when a plurality of authentication servers are set up in the same network, the information regarding the radio device registration can be shared among these authentication servers by the method that can maintain the consistency. Consequently, it becomes possible to improve the reliability of the network compared with the case where it is only possible to set up a single authentication server. Thus, even in the case of using a plurality of authentication servers in the network, it is possible to maintain the consistency in the information of devices existing in the network and improve the reliability and the safety of the communications within the network.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for managing a network of radio devices using at least one authentication server, the method comprising:
    deleting information of a first radio device to be deleted from registration information of the radio devices at a deletion accepting authentication server which is an authentication server that acquired deletion information for deleting the information of the first radio device from the network;
    transmitting the deletion information from the deletion accepting authentication server to other authentication servers related to the network;
    sending a response from a deletion information receiving authentication server which is one of the other authentication servers that received the deletion information, to the deletion accepting authentication server;
    deleting the information of the first radio device from the registration information of the radio devices according to the deletion information, at the deletion information receiving authentication server;
    generating a list of deletion information non-receiving authentication servers which are authentication servers that failed to respond, and re-transmitting the deletion information to the deletion information non-receiving authentication servers, at the deletion accepting authentication server; and
    deleting the information of the first radio device from the registration information of the radio devices at each deletion information non-receiving authentication server.

2. The method of claim 1, wherein when the response is received from one deletion information non-receiving authentication server after re-transmitting the deletion information to the deletion information non-receiving authentication servers, said one deletion information non-receiving authentication server is deleted from the list of the deletion information non-receiving authentication servers.

3. The method of claim 1, further comprising:
    sending the list of the deletion information non-receiving authentication servers from the deletion accepting authentication server to the deletion information receiving servers;
    re-transmitting the deletion information to the deletion information non-receiving authentication servers according to the list of the deletion information non-receiving authentication servers, at the deletion information receiving authentication servers; and
    deleting the information of the first radio device from the registration information of the radio devices at each deletion information non-receiving authentication server which received the deletion information from one of the deletion information receiving authentication server.

4. The method of claim 3, wherein when the response is received from one deletion information non-receiving authentication server after re-transmitting the deletion information to the deletion information non-receiving authentication servers from the deletion information receiving authentication servers, said one deletion information non-receiving authentication server is deleted from the list of the deletion information non-receiving authentication servers at the deletion information receiving authentication servers.

5. The method of claim 1, wherein when there is a registration request for a second radio device, the method further comprises:

requesting connections from a registration target authentication server which is an authentication server for carrying out a registration of the second radio device, to other authentication servers related to the network;

establishing a synchronization of infonnation regarding the registration of the radio devices related to the network, from the registration target authentication server to the other authentication servers when responses to requests from all the other authentication servers are received;

acquiring registration information which is information of the second radio device at the registration target authentication server;

transmitting the registration information from the registration target authentication server to the other authentication servers;

judging whether all the other authentication servers have received the registration information at the registration target authentication server;

notifying registration completion from the registration target authentication server to all the other authentication servers according to judgement at the judging step; and registering the registration information of the second radio device at the registration target authentication server and the other authentication servers.

6. The method of claim 5, wherein when the registration target authentication server establishes the synchronization of the information regarding the registration of the radio devices related to the network to the other authentication servers, the method further comprises:

requesting a transfer of the list of the deletion information non-receiving authentication servers from the registration target authentication server to the other authentication servers;

transmitting the list of the deletion information non-receiving authentication servers and the information of the first radio device from the other authentication servers to the registration target authentication server in response to request;

transmitting the information of the first radio device to the deletion information non-receiving authentication servers according to the list of the deletion information non-receiving authentication servers transmitted from the other authentication servers;

deleting the information of the first radio device from the registration information of the radio devices at the deletion information non-receiving authentication servers according to the list of the deletion information non-receiving authentication servers, according to the information of the first radio device transmitted from the registration target authentication server, at the deletion information non-receiving authentication servers according to the list of the deletion information non-receiving authentication servers;

transmitting notices of deletion from the deletion information non-receiving authentication servers according to the list of the deletion information non-receiving authentication servers to the registration target authentication server of the second radio device after the deletion; and transmitting a notice of completion of the deletion from the registration target authentication server to the other authentication servers when the notices of deletion are received from all the deletion information non-receiving authentication servers according to the list of the deletion information non-receiving authentication servers.

7. The method of claim 6, wherein when the registration target authentication server establishes the synchronization of the information regarding the registration of the radio devices related to the network to the other authentication servers and a plurality of the other authentication servers exist, the method further comprises:

requesting from the registration target authentication server to each one of the other authentication servers a transfer of the list of the deletion information non-receiving authentication servers;

transmitting the list of the deletion information non-receiving authentication servers and the information of the first radio device from each one of the other authentication servers to the registration target authentication server in response to request;

transmitting the information of the first radio device to the deletion information non-receiving authentication servers according to the list of the deletion information non-receiving authentication servers transmitted from each one of the other authentication servers;

deleting the information of the first radio device from the registration information of the radio devices at the deletion information non-receiving authentication servers according to the list of the deletion information non-receiving authentication servers, according to the information of the first radio device transmitted from the registration target authentication server, at the deletion information non-receiving authentication servers according to the list of the deletion information non-receiving authentication servers;

transmitting notices of deletion from the deletion information non-receiving authentication servers according to the list of the deletion information non-receiving authentication servers to the registration target authentication server of the second radio device after the deletion; and transmitting a notice of completion of the deletion from the registration target authentication server to each one of the other authentication servers when the notices of deletion are received from all the deletion information non-receiving authentication servers according to the list of the deletion information non-receiving authentication servers.

8. A computer program product stored in a computer readable medium, for causing computers that manage a network of radio devices when executing the computer program product, to carry out processings including:

deleting information of a first radio device to be deleted from registration information of the radio devices at a deletion accepting authentication server which is an authentication server that acquired deletion information for deleting the information of the first radio device from the network;

transmitting the deletion information from the deletion accepting authentication server to other authentication servers related to the network;

sending a response from a deletion information receiving authentication server which is one of the other authentication servers that received the deletion information, to the deletion accepting authentication server;

deleting the information of the first radio device from the registration information of the radio devices according to the deletion information, at the deletion information receiving authentication server;

generating a list of deletion information non-receiving authentication servers which are authentication servers that failed to respond, and re-transmitting the deletion information to the deletion information non-receiving authentication servers, at the deletion accepting authentication server; and deleting the information of the first radio device from the registration information of the radio devices at each deletion information non-receiving authentication server.

9. The computer program product of claim 8, wherein the processings include that in which when the response is received from one deletion information non-receiving authentication server after re-transmitting the deletion information to the deletion information non-receiving authentication servers, said one deletion information non-receiving authentication server is deleted from the list of the deletion information non-receiving authentication servers.

10. The computer program product of claim 8, wherein the processings further include:

sending the list of the deletion information non-receiving authentication servers from the deletion accepting authentication server to the deletion information receiving servers;

re-transmitting the deletion information to the deletion information non-receiving authentication servers according to the list of the deletion information non-receiving authentication servers, at the deletion information receiving authentication servers; and deleting the information of the first radio device from the registration information of the radio devices at each deletion information non-receiving authentication server which received the deletion information from one of the deletion information receiving authentication server.

11. The computer program product of claim 10, wherein the processings include that in which when the response is received from one deletion information non-receiving authentication server after re-transmitting the deletion information to the deletion information non-receiving authentication servers from the deletion information receiving authentication servers, said one deletion information non-receiving authentication server is deleted from the list of the deletion information non-receiving authentication servers at the deletion information receiving authentication servers.

12. The computer program product of claim 8, wherein when there is a registration request for a second radio device, the processings further include:

requesting connections from a registration target authentication server which is an authentication server for carrying out a registration of the second radio device, to other authentication servers related to the network;

establishing a synchronization of information regarding the registration of the radio devices related to the network, from the registration target authentication server to the other authentication servers when responses to requests from all the other authentication servers are received;

acquiring registration information which is information of the second radio device at the registration target authentication server;

transmitting the registration information from the registration target authentication server to the other authentication servers;

judging whether all the other authentication servers have received the registration information at the registration target authentication server;

notifying registration completion from the registration target authentication server to all the other authentication servers according to judgement at the judging step; and registering the registration information of the second radio device at the registration target authentication server and the other authentication servers.

13. The computer program product of claim 12, wherein when the registration target authentication server establishes the synchronization of the information regarding the registration of the radio device related to the network to the other authentication servers, the processings further include:

requesting a transfer of the list of the deletion information non-receiving authentication servers from the registration target authentication server to the other authentication servers;

transmitting the list of the deletion information non-receiving authentication servers and the information of the first radio device from the other authentication servers to the registration target authentication server in response to request;

transmitting the information of the first radio device to the deletion information non-receiving authentication servers according to the list of the deletion information non-receiving authentication servers transmitted from the other authentication servers;

deleting the information of the first radio device from the registration information of the radio devices at the deletion information non-receiving authentication servers according to the list of the deletion information non-receiving authentication servers, according to the information of the first radio device transmitted from the registration target authentication server, at the deletion information non-receiving authentication servers according to the list of the deletion information non-receiving authentication servers;

transmitting notices of deletion from the deletion information non-receiving authentication servers according to the list of the deletion information non-receiving authentication servers to the registration target authentication server of the second radio device after the deletion; and transmitting a notice of completion of the deletion from the registration target authentication server to the other authentication servers when the notices of deletion are received from all the deletion information non-receiving authentication servers according to the list of the deletion information non-receiving authentication servers.

14. The computer program product of claim 13, wherein when the registration target authentication server establishes the synchronization of the information regarding the registration of the radio devices related to the network to the other authentication servers and a plurality of the other authentication servers exist, the processings further include:

requesting from the registration target authentication server to each one of the other authentication servers a transfer of the list of the deletion information non-receiving authentication servers;

transmitting the list of the deletion information non-receiving authentication servers and the information of the first radio device from each one of the other authentication servers to the registration target authentication server in response to request;

transmitting the information of the first radio device to the deletion information non-receiving authentication servers according to the list of the deletion information non-receiving authentication servers transmitted from each one of the other authentication servers;

deleting the information of the first radio device from the registration information of the radio devices at the deletion information non-receiving authentication servers according to the list of the deletion information non-receiving authentication servers, according to the information of the first radio device transmitted from the registration target authentication server, at the deletion information non-receiving authentication servers according to the list of the deletion information non-receiving authentication servers;

transmitting notices of deletion from the deletion information non-receiving authentication servers according to the list of the deletion information non-receiving authentication servers to the registration target authentication server of the second radio device after the deletion; and transmitting a notice of completion of the deletion from the registration target authentication server to each one of the other authentication servers when the notices of deletion are received from all the deletion information non-receiving authentication servers according to the list of the deletion information non-receiving authentication servers.

* * * * *